(12) United States Patent
Bekker et al.

(10) Patent No.: US 11,984,114 B2
(45) Date of Patent: May 14, 2024

(54) SPEECH TO INTENT

(71) Applicant: Snap Inc., Santa Monica, CA (US)

(72) Inventors: Alan Bekker, Givaat Shmuel (IL); Itamar Schen, Jerusalem (IL); Jackie Assa, Herzliya (IL); Einav Itamar, Herzliya (IL); Nave Algarici, Albany, CA (US)

(73) Assignee: SNAP INC., Santa Monica, CA (US)

( * ) Notice: Subject to any disclaimer, the term of this patent is extended or adjusted under 35 U.S.C. 154(b) by 317 days.

(21) Appl. No.: 17/495,402

(22) Filed: Oct. 6, 2021

(65) Prior Publication Data

US 2023/0104583 A1  Apr. 6, 2023

(51) Int. Cl.
*G10L 15/16* (2006.01)
*G06N 3/045* (2023.01)
*G06N 3/084* (2023.01)
*G10L 15/06* (2013.01)

(52) U.S. Cl.
CPC .............. *G10L 15/16* (2013.01); *G06N 3/045* (2023.01); *G06N 3/084* (2013.01); *G10L 15/063* (2013.01)

(58) Field of Classification Search
CPC ....... G10L 15/16; G10L 15/28; G10L 15/063; G10L 15/02; G10L 15/1815; G10L 15/22; G10L 15/26; G06N 3/045; G06N 3/084; G06N 3/044; G06N 3/09; G06N 3/08
See application file for complete search history.

(56) References Cited

U.S. PATENT DOCUMENTS

2019/0188590 A1*  6/2019  Wu .................... G06F 40/30

FOREIGN PATENT DOCUMENTS

CN   111881297       11/2020
CN   111881297 A  *  11/2020
WO   WO-2023060111 A1   4/2023

OTHER PUBLICATIONS

Shivakumar et al. (RNN Based Incremental Online Spoken Language Understanding) https://scholar.google.com/scholar?q=RNN+Based+Incremental+Online+Spoken%0D%0Alanguage+Understanding&hl=en&as_sdt=0&as_vis=1&oi=scholart (Year: 2021).*
"International Application Serial No. PCT/US2022/077585, International Search Report dated Dec. 20, 2022", 5 pgs.
"International Application Serial No. PCT/US2022/077585, Written Opinion dated Dec. 20, 2022", 6 pgs.

(Continued)

*Primary Examiner* — Yogeshkumar Patel
(74) *Attorney, Agent, or Firm* — SCHWEGMAN LUNDBERG & WOESSNER, P.A.

(57) ABSTRACT

Systems and methods are provided for performing speech to intent classification. The systems and methods perform operations comprising: receiving an audio file comprising speech input; processing, by a speech recognition engine, the audio file comprising the speech input to generate an initial character-based representation of the speech input; processing, by an intent classifier, the initial character-based representation of the speech input to generate an estimated intent of the speech input; and generating, by the speech recognition engine, a textual representation of the speech input based on the estimated intent of the speech input.

20 Claims, 10 Drawing Sheets

(56) References Cited

OTHER PUBLICATIONS

Cao, Yiran, "Sequential End-to-End Intent and Slot Label Classification and Localization", arxiv.org, Cornell University Library, 201 Olin Library Cornell University Ithaca, NY 14853, (Jun. 8, 2021), 5 pgs.

Liu, Bing, "Joint Online Spoken Language Understanding and Language Modeling with Recurrent Neural Networks", arxiv.org, Cornell University Library, 201 Olin Library Cornell University Ithaca, Ny 14853, (Sep. 6, 2016), 9 pgs.

Potdar, Nihal, "A Streaming End-to-End Framework For Spoken Language Understanding", [Online]. Retrieved from the Internet: <URL:https://arxiv.org/pdf/2105.10042.pdf>, (Jul. 17, 2021), 9 pgs.

Rai, Milind, "Speech To Semantics: Improve ASR and NLU Jointly via All-Neural Interfaces", arxiv.org, Cornell University Library, 201 Olin Library Cornell University Ithaca, NY 14853, (Aug. 14, 2020), 5 pgs.

Shivakumar, Prashanth Gurunath, "RNN Based Incremental Online Spoken Language Understanding Online Spoken Language Understanding", 2021 IEEE Spoken Language Technology Workshop (SLT), IEEE, (Jan. 19, 2021), 8 pgs.

\* cited by examiner

FIG. 7

| | C1 | C2 | C3 | C4 | C5 | C6 | | Cn |
|---|---|---|---|---|---|---|---|---|
| T1 | P1 | P2 | P3 | P4 | P5 | P6 | ● ● ● | |
| T2 | P3 | P2 | P5 | P4 | P1 | P6 | ● ● ● | |
| T3 | P6 | P2 | P3 | P4 | P1 | P5 | ● ● ● | |
| T4 | P5 | P2 | P3 | P4 | P6 | P1 | ● ● ● | |
| T5 | P5 | P2 | P3 | P4 | P1 | P6 | ● ● ● | |
| T6 | P2 | P5 | P1 | P3 | P4 | P6 | ● ● ● | |

SPEECH TO INTENT

TECHNICAL FIELD

The present disclosure generally relates to the technical field of social networks. In particular, the present examples are generally directed to performing speech recognition.

BACKGROUND

As the popularity of social networking grows, social networks are expanding their capabilities. To improve ease of use, social networks are integrating more and more functions such that a user may accomplish many or even most of their computer-based tasks within the social network itself. Some social networks allow users to perform tasks using voice commands.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which:

FIG. 7 is a diagrammatic representation of a character-based. matrix of the speech to intent system, in accordance with some examples.

DETAILED DESCRIPTION

Figure 1:
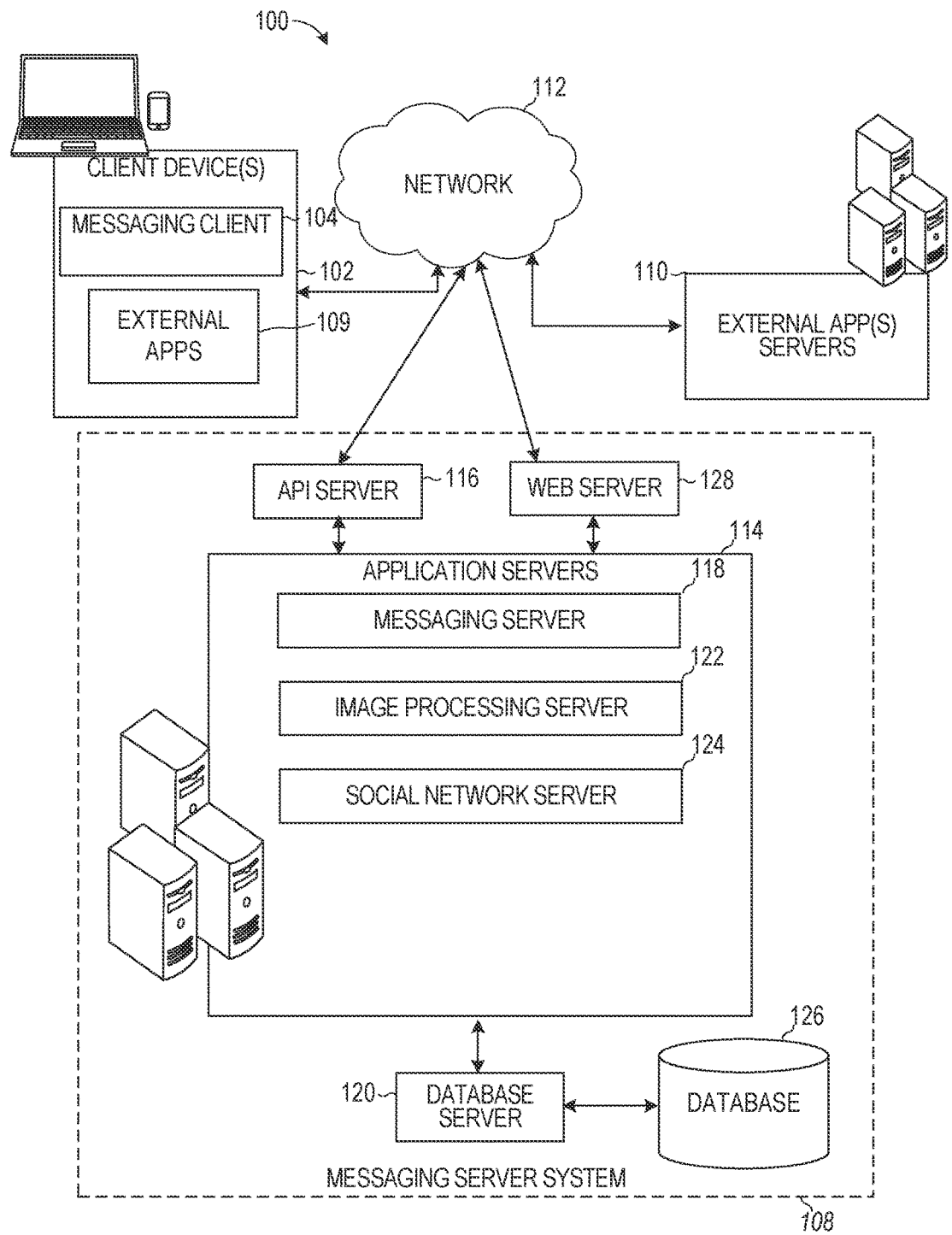
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Certain social networking systems allow users to control operations of the social networking systems by providing several predetermined commands verbally, such as capture, compose, send, delete, set color, and so forth. However, in these systems, the users have to learn ahead of time what exact commands can be provided verbally. Namely, the users have to spend time learning the exact format and type of commands they can issue verbally, which takes time and effort and takes away from the appeal of controlling the social networking systems verbally.

One of the key tasks of conversational systems is understanding the objectives of the speech input received from a user. In most use cases, as conversations have a narrow business focus, this is often implemented by transformer-based neural networks, which train on a large corpus of supervised tagged intents and slots. In typical systems, a speech input is first processed by a speech recognition model to generate a textual transcription of the received speech input. This textual transcription is then processed by an intent classifier to determine the intent of the user in order to perform one of several social networking functions. While such systems generally work well, because the intent classifier is decoupled from the raw speech input processed by speech recognition module, the quality of the output of the intent classifier is limited by the quality of the output of the speech recognition module. Namely, if the speech recognition module fails to accurately generate a transcription of the received speech input, the intent classifier will also fail to provide an accurate intent classification, which causes the speech recognition (e.g., the intent classifier) to execute the wrong or unintended operation. This can be very frustrating to users and can detract from the overall appeal of operating a social networking system using verbal input.

The disclosed techniques improve the efficiency of using the electronic device by providing a speech recognition system that estimates a user's intent from a partial transcription of the raw speech input. According to the disclosed techniques, a speech recognition engine is trained in an end-to-end fashion or manner with an intent classifier. This way, the speech transcriptions generated by the speech recognition engine take into account the actual intent of the given speech input as determined by the intent classifier (e.g., a character-based intent classifier). This improves the overall ability and accuracy for generating transcriptions by the speech recognition engine and improves the quality of the intent classifications generated by the intent classifier.

In an example, the intent classifier receives a representation of the raw speech input from the speech recognition engine before the speech recognition engine completely decodes the raw speech input into a textual transcription. The representation can include a logit lattice that represents hidden layers (initial character-based representation of the speech input)) processed by the speech recognition engine in generating the textual transcription. The intent classifier can operate on the hidden layers (logit lattice) or the initial character-based representation of the speech input to generate an intent classification. Because the intent classification is generated by processing the initial character-based representation of the speech input rather than a finalized transcription of the speech input, the accuracy of the intent generated by the intent classifier is not hamstrung by the quality of the transcription generated by the speech recognition engine. The output of the intent classifier can be fed back to the speech recognition engine to further refine any transcription or decoding performed by the speech recognition engine to generate the final speech input transcription. This significantly improves the overall ability for the social network system to perform automated speech recognition and intent classification by ensuring that any transcriptions generated by the speech recognition engine take into account the intent classifications of the speech input.

Specifically, the disclosed techniques receive an audio file comprising speech input. The disclosed techniques process, by a speech recognition engine, the audio file comprising the speech input to generate an initial character-based representation of the speech input. The disclosed techniques process, by an intent classifier, the initial character-based representation of the speech input to generate an estimated intent of the speech input. The disclosed techniques then can optionally generate, by the speech recognition engine, a textual representation of the speech input based on the estimated intent of the speech input.

In this way, the disclosed techniques provide a much more intuitive, robust, and engaging conversation and speech recognition system and avoid having the user learn ahead of time the specific types of commands the social networking system or speech recognition system can accept. This increases the efficiency at which social networking systems can be accessed and interacted with, which reduces the amount of resources needed to perform routine social networking tasks and operations.

The disclosed techniques provide a way to automatically and easily generate effective machine/human conversations focused on performing social networking operations.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party' applications 109 using Applications Program Interfaces (APIs).

A messaging client 104 is able to communicate and exchange data with other messaging clients 104 and with the messaging server system 108 via the network 112.. The data exchanged between messaging clients 104, and between a messaging client 104 and the messaging server system 108. includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, watermarks (combined indications of messages and reactions being read or presented to a user of a. client device 102) and live event information, as examples. Data exchanges within the messaging system 100 are invoked and controlled through functions available via user interfaces (UIs) of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages and reactions processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., watermarks, commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a. collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
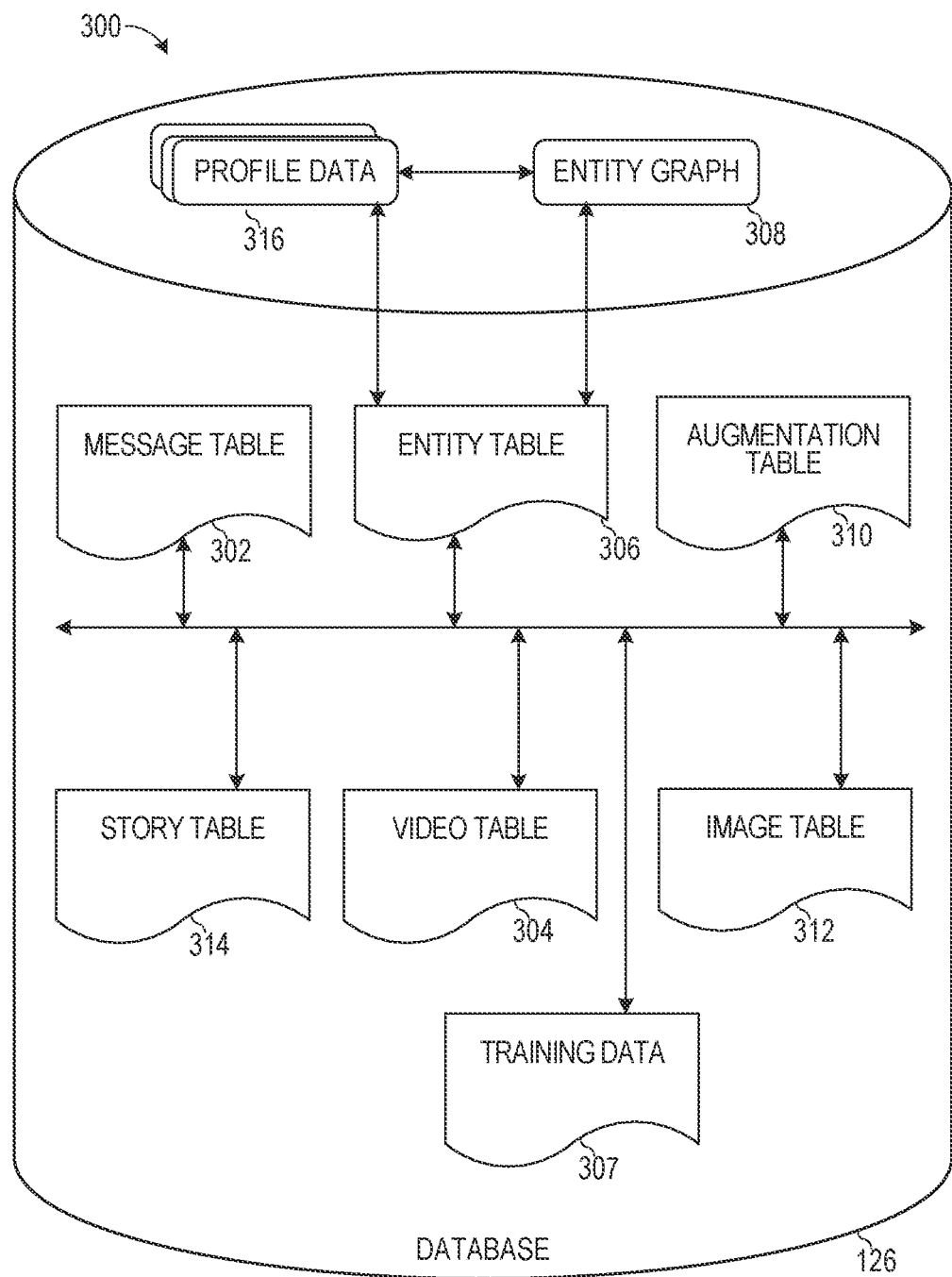
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an external application 109 or applet) are made available to a user via an interface of the messaging client 104. The messaging client 104 receives a user selection of an option to launch or access features of an external resource (e.g, a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on external app(s) servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can he launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

In some examples, the messaging client 104 can present an augmented reality experience that can provide speech or conversation-based interactions. For example, the messaging client 104 can capture an image or video of a user (or a 2D or 3D environment), such as using a front-facing camera of the client device 102. The messaging client 104 can overlay or display on the image or video that depicts the user one or more augmented reality graphical elements that make up the augmented reality experience. As an example, the messaging client 104 can display augmented reality fashion items, such as makeup, clothing, jewelry, hats or glasses. As another example, the messaging client 104 can present an avatar as the augmented reality graphical elements that represents the user. As another example, the messaging client 104 can capture an image or video of an environment that depicts a vehicle. In such cases, the messaging client 104 can receive speech interaction (input) from the user requesting to change a color of the vehicle. In response, the messaging client 104 can display the vehicle with an augmented reality color requested by the speech interaction.

The messaging client 104 can receive speech input from the user (e.g., "Please change the frame to blue") while the augmented reality experience is being presented to the user (e.g., while the augmented reality graphical elements are being displayed on the image that depicts the user). As an example, the speech input can include a request, to make a change to the augmented reality graphical elements, such as changing a color of one or more of the augmented reality graphical elements, changing a style, changing a size or shape, changing a material, changing a virtual property (e.g., asking to increase image brightness by a bit or painting a building more vividly), and/or changing an audio attribute of the augmented reality experience. In response to receiving the speech input, the messaging client 104 can apply a speech recognition engine to the speech input to determine an intent of the speech input and/or to generate a transcription of the speech input. The intent can then be used to perform a corresponding function requested by the speech input, such as changing a lens type, changing frame shape, changing frame color, and so forth. The intent can also be used to determine "positive intent," "negative intent," "confirmation," "hesitation," and so forth. Each intent can be detected by the function to control the appearance of the augmented reality graphical elements and also control the next steps or flow of the conversation.

The speech recognition model processes the raw speech input ("Please change the frames to blue") using both a speech recognition engine and a character-based intent classifier. Specifically, the speech recognition engine generates an initial character-based representation of the raw speech input. This can be provided as a matrix of probabilities of characters by time. This matrix can be provided to the character-based intent classifier and processed while the speech recognition engine continues processing the raw speech input to decode and generate a transcription (textual representation) of the raw speech input.

The character-based intent classifier generates an estimated intent of the raw speech input, such as by determining which combinations of character probabilities by time represent the most likely intent of the speech input. This estimated intent (and combinations of character probabilities) can in some cases be fed back to the speech recognition engine to refine or improve the transcription (textual representation) of the raw speech input generated by the speech recognition engine.

In some examples, the speech recognition engine and the intent classifier are neural networks that are trained in an end-to-end manner based on two loss functions operating on a same set of speech input training data. As a result, because the intent classifier operates on raw speech data (prior to the speech recognition engine completely decoding the speech input), the intent classifier can generate a more accurate prediction of intent of the speech input than traditional systems in which the intent classifier operates on a complete transcription and decoded output of the speech recognition engine. Also, because the speech recognition engine performs decoding of the speech input into the transcription based on an estimated intent provided by the intent classifier, the accuracy of the output of the speech recognition engine is improved.

The messaging client 104 processes the intent and transcription of the speech input to modify the augmented reality graphical elements currently being presented over the depiction of the user in the image. For example, the messaging client 104 changes a color value of an augmented reality glasses object from a first color to an updated second color (e.g., when the speech input requests a change to a color or brightness of the glasses). The messaging client 104 also displays the transcription of the speech input (as feedback to the user) and generates an audio response to the speech input.

System Architecture

Figure 2:
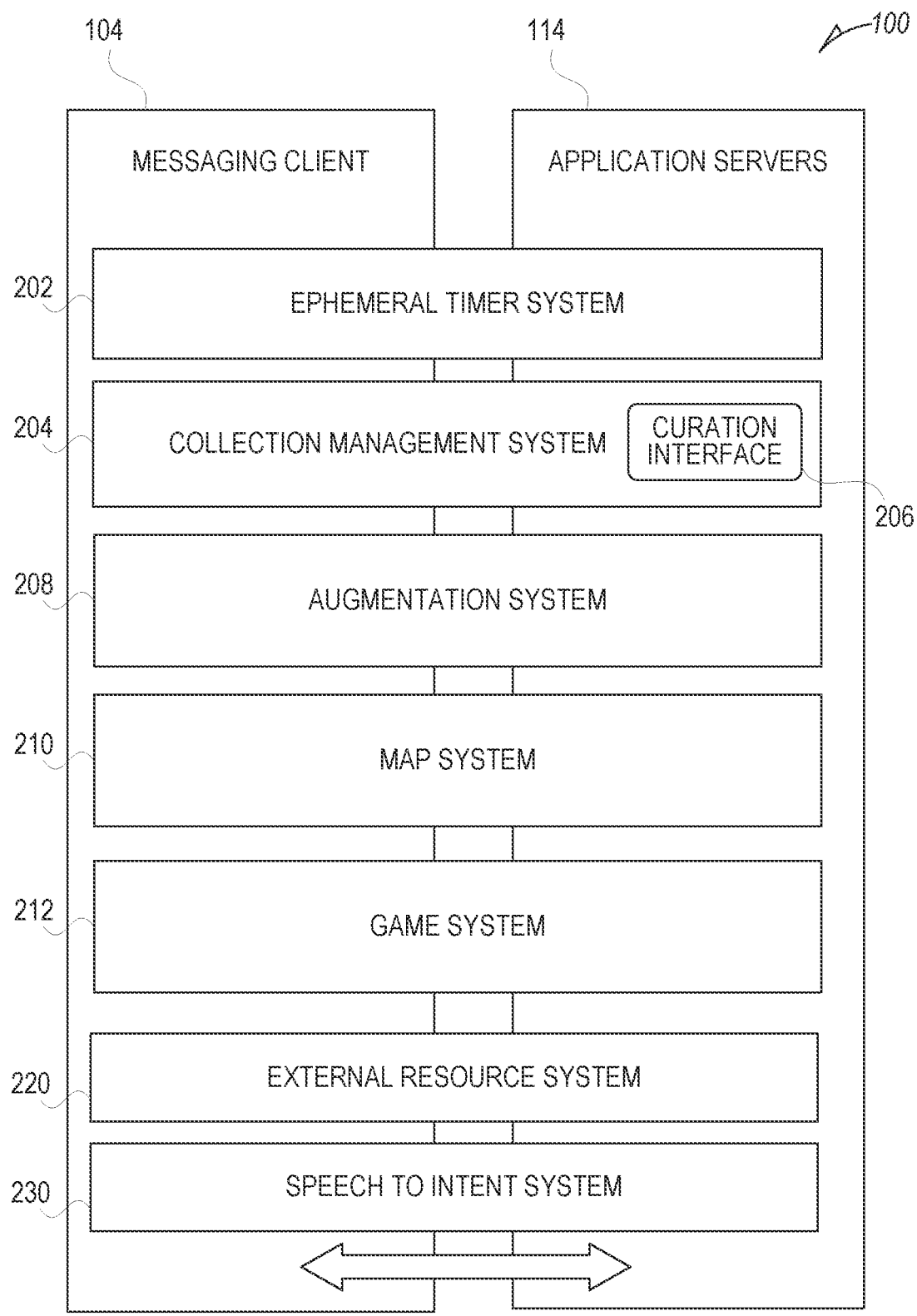
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 11.4. These subsystems include, for example, an ephemeral tinier system 202, a collection management system 204, an augmentation system 208, a map system 210, a game system 212, an external resource system 220, and a speech to intent system 230.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral er system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter or augmented reality item) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. The media overlay in some cases is referred to as an augmented reality item. An example of a visual effect includes color overlaying. The audio and visual content or the visual effects can be applied to a media content item (e,g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102. to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected, as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The augmentation system 208 allows users to create custom media overlays or augmented reality items. Such media overlays may include one or more different feature types. For example, the media overlays may include the facial tracking—based features in which one or more augmented reality items are modified based on movement of facial features detected in a received or captured image or video. As another example, the media overlays may include the audio clip—based features in which a sound clip or audio clip is associated with one or more augmented reality items that are presented in a received or captured image or video. As another example, the media overlays may include the gyroscopic or accelerometer-based features in which one or more augmented reality items are modified based on movement of the client device 102 on which a received or captured image or video is displayed. The custom media overlays can be shared with other users of the messaging application. The other users can select to launch or access the custom media overlays. in response, the features of the custom media overlays are retrieved and used to augment or modify one or more images or videos presented on client devices of the other users.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information using an appropriate status avatar) with other users of the messaging system 100 via the messaging client 104, with this location and status information being similarly displayed within the context of a map interface of the messaging client 104 to selected users.

In some examples, the messaging client 104 can receive conversational or speech input from a user requesting an interaction with the map system 210. Based on an intent classification of the speech input and accurate transcription of the speech input, the messaging client 104 can send a message to a friend that is depicted on the map or perform other map-based functions.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items). Based on an intent classification of the speech input and accurate transcription of the speech input, the messaging client 104 can perform game-based functions.

The external resource system 220 provides an interface for the messaging client 104 to communicate with external app(s) servers 110 to launch or access external resources. Each external resource (apps) server 110 hosts, for example, a markup language (e.g., HTML,5)—based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript. leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used. Based on an intent classification of the speech input and accurate transcription of the speech input, the messaging client 104 can perform external resource-based functions.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time e.g., 3 seconds) of displaying the landing page or title screen of the external resource, the messaging client 104 slides up a menu (es., animates a menu as surfacing from a bottom of the screen to a middle of or other portion of the screen) for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104.

In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The speech to intent system 230 manages conversation interaction between an end user and the messaging client 104. Specifically, the speech to intent system 230 is trained to perform speech recognition on speech input received from a user in a manner that takes into account intent of the user's speech input. The speech to intent system 230 performs intent classification for the speech input in parallel with (while) the speech recognition engine transcribes the speech input. The speech to intent system 230 processes character probabilities of the speech input included in a matrix to determine or estimate an intent of the speech input. The intent classifier of the speech to intent system 230 operates on a stream or vector of characters provided by the speech recognition engine before the speech recognition engine completes decoding the speech input. This way, the intent classifier can estimate an intent of the speech input in a way that is not dependent on the transcription or decoding provided by the speech recognition engine.

The speech recognition engine can then complete or refine the decoding of the speech input based on the intent classification generated by the intent classifier. In some cases, the speech to intent system 230 trains the intent classifier and the speech recognition engine in an end-to-end manner based on a loss function that takes into account two or more cost functions. The two or more cost functions include a cost function that computes loss based on an intent classification and another cost function that computes loss based on a transcription of the speech input. The intent classifier and the speech recognition engine are trained using back propagation over a plurality of batches of training data.

In an example, the speech to intent system 230 receives speech input from the user via the client device 102, such as from a microphone of the client device 102.. During training, the speech to intent system 230 receives speech input from a plurality of training data stored in a database. Further details of the speech to intent system 230 are provided in connection with FIG. 5.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a. recognized entity. Each entity is provided with a unique identifier, as well as an entity type identifier (not shown).

The entity graph 308 stores information regarding relationships and associations between entities. Such relationships may be social, professional (e.g., work at a common corporation or organization) interest-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then display on a screen of the client device 102 with the modifications. This also includes modifications to stored content, such as video clips in a gallery that may be modified. For example, in a client device 102 with access to multiple augmented reality content items, a user can use a single video clip with multiple augmented. reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. in still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data. (e.g., video streams, video files, etc.) saved in a memory of a computerized system of any kind. For example, a user can load video files and save them in a. memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of the object are calculated (e.g., using an Active Shape Model (ASM) or other known methods). Then, a mesh based on the characteristic points is generated for each of the at least one elements of the object. This mesh is used in the following stage of tracking the elements of the object in the video stream. In the process of tracking, the mentioned mesh for each element is aligned with a position of each element, Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. if an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a. computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). in various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102. is located within a specific geographic location (es., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Training data 307 stores a plurality of speech inputs and corresponding ground-truth intents and ground-truth transcriptions. The training data 307 is processed by the speech to intent system 230 to train the speech recognition engine and the intent classifier in an end-to-end manner.

Data Communications Architecture

Figure 4:
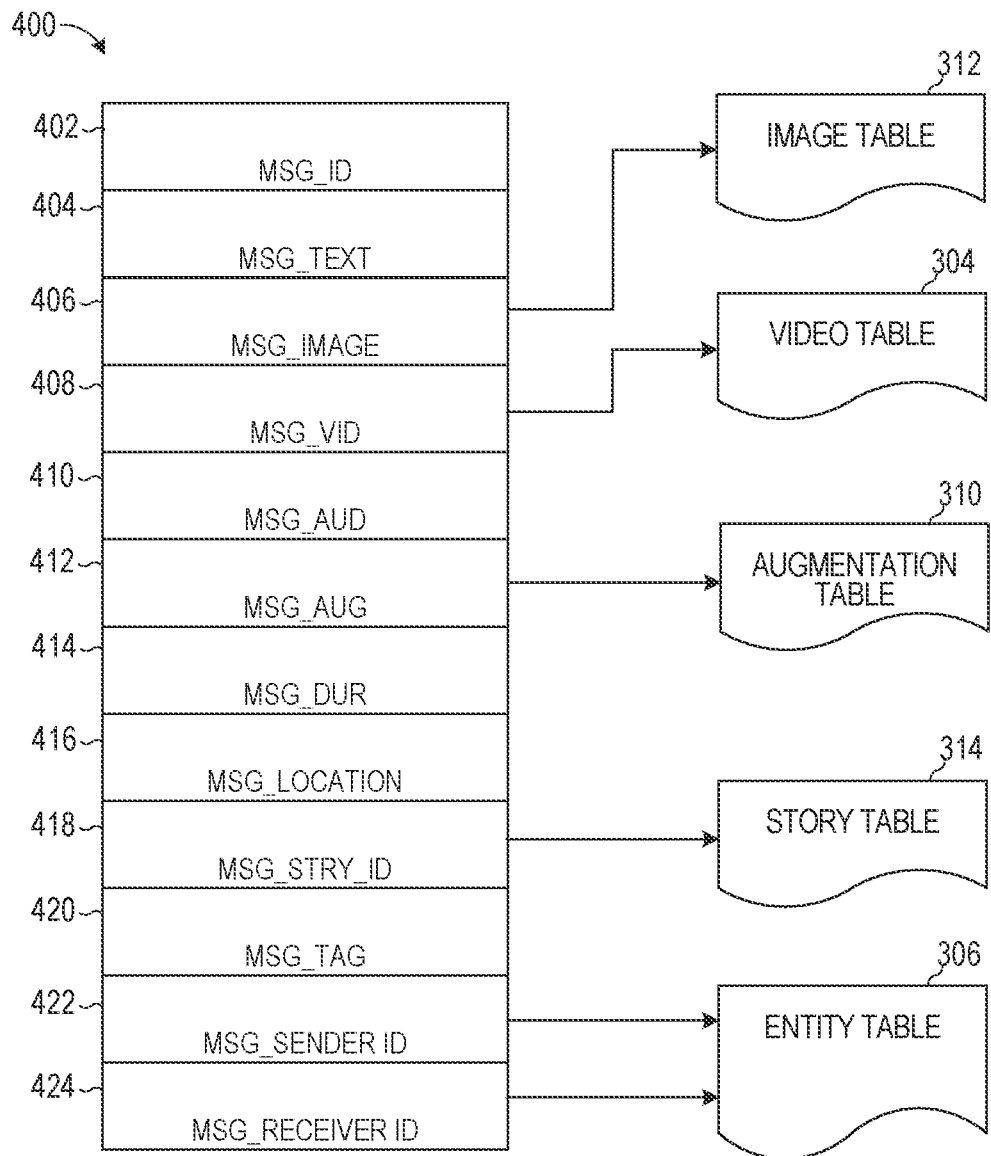
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304. values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Speech to Intent System

Figure 5:
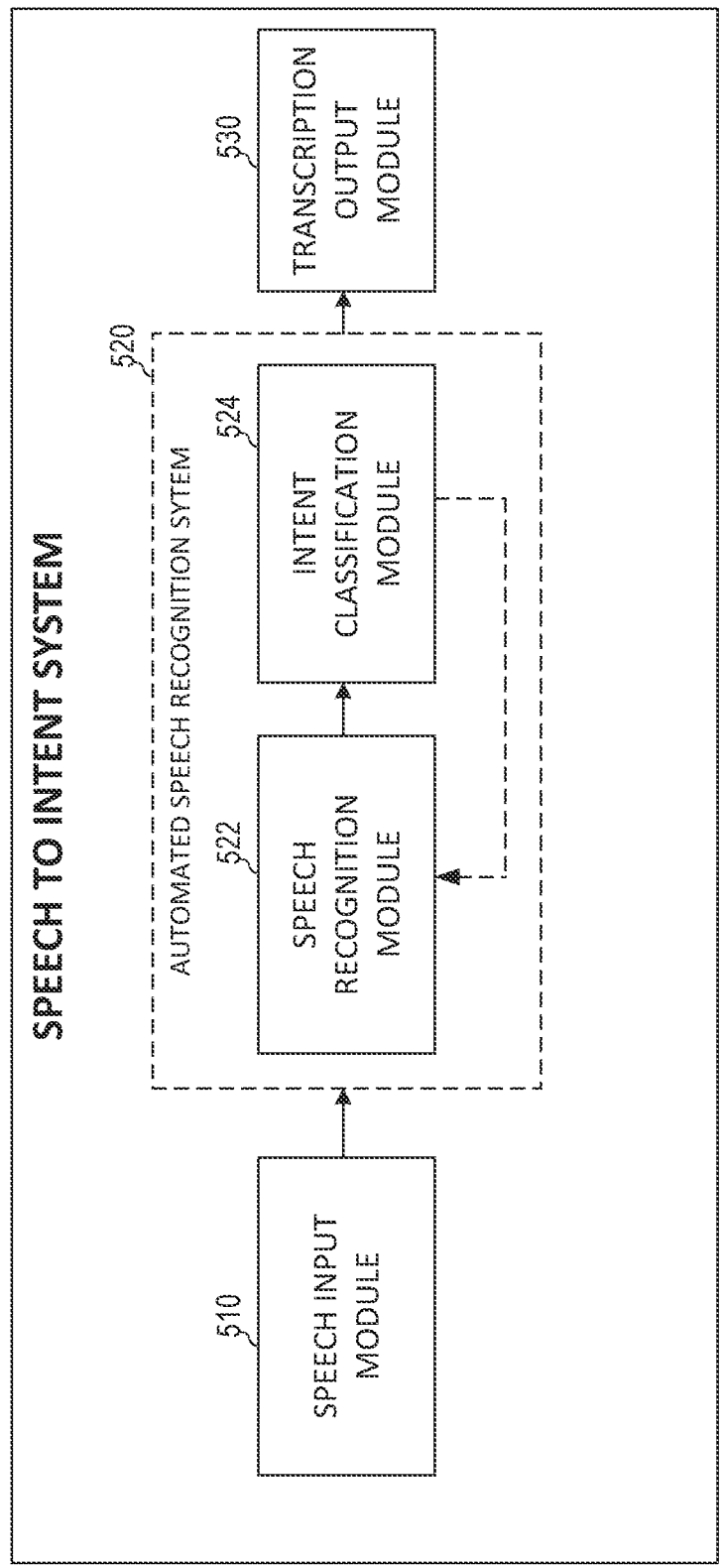
FIG. 5 illustrates the speech to intent system, in accordance with some examples.

FIG. 5 illustrates the speech to intent system 230 according to some examples. The speech to intent system 230 includes speech input module 510, an automated speech recognition system 520, and a transcription output module 530. While all of the components are drawn as being part of the speech to intent system 230, any one or all of the components can be implemented by separate devices and be in geographically disparate locations. As mentioned previously, the speech to intent system 230 manages conversation interaction between an end user and a messaging client 104 including one or more features implemented by the messaging client 104, such as an augmented reality experience, a gaming system, a communication system, and an external resource system.

The speech input module 510 operates in two modes—a training mode and a trained mode. In the training mode, the speech input module 510 obtains batches of training data 307 to provide one or more speech input (including speech input audio files) to the automated speech recognition system 520. The training mode persists until a stopping criterion is met by the automated speech recognition system 520 and/or when a threshold quantity or number of training speech input audio files have been processed. In the trained mode, the speech input module 510 receives raw speech input defined in a speech input audio file from a microphone of a client device 102.

The speech to intent system 230 can train an automated speech recognition system 520 (e.g., including one or more neural networks) based on a plurality of training data (including various speech inputs and corresponding ground-truth intents and ground-truth transcriptions). The automated speech recognition system 520 is trained to establish a relationship between raw character probabilities associated with a speech input audio file and the ground truth intent in addition to establishing a relationship between the raw speech input audio file and the ground-truth transcription. The automated speech recognition system 520 includes a speech recognition module 522 that is arranged in a cascade arrangement (e.g., as a cascade neural network) with an intent classification module 524. The automated speech recognition system 520 implements one or more machine learning models that are trained to process speech input to determine an intent of the speech input and a transcription of the speech input.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data (e.g., speech inputs and corresponding schemas or configurable entities) in order to make data-driven predictions or decisions expressed as outputs or assessments. Although example embodiments are presented with respect to a few machine-learning tools, the principles presented herein may be applied to other machine-learning tools. In some example embodiments, different machine-learning tools may be used. For example, Logistic Regression (LR), Naive-Bayes, Random Forest (RF). neural networks (NN), matrix factorization, and Support Vector Machines (SVM) tools may be used for estimating intent based on speech input.

The machine-learning algorithms utilize features for analyzing the data to generate assessments. A feature is an individual measurable property of a phenomenon being observed. The concept of a feature is related to that of an explanatory variable used in statistical techniques such as linear regression. Choosing informative, discriminating, and independent features is important for effective operation in pattern recognition, classification, and regression. Features may be of different types, such as numeric features, strings, and graphs.

The machine-learning algorithms utilize the training data to find correlations among the identified features that affect the outcome or assessment. In some example embodiments, the training data includes labeled data, which is known data for one or more identified features and one or more outcomes.

Once the training data are collected and processed, the automated speech recognition system 520 can be built using either statistical learning or machine learning techniques. In one embodiment, regression analysis can be used to build the automated speech recognition system 520. Regression analysis is a statistical process for estimating the relationships among variables. There are a number of known methods to perform regression analysis. Linear regression or ordinary least squares regression, among others, are "parametric" in that the regression function is defined in terms of a. finite number of unknown model parameters that can be estimated from training data. For example, a regression model (e.g., Equation 1) can be defined, for example, as:

$$H \approx f(X \cdot \beta), \text{ (Equation 1)}$$

where "H" denotes the known transcription and intent, "X" denotes a vector of input variables (e.g., pairs of batches of speech inputs), and "β" denotes a vector of unknown parameters to be determined or trained for the regression model.

The training data that include pairs of batches of speech inputs and corresponding schema types or configurable entity types and the corresponding configurable entity update or intent/slot (which can be manually or automatically specified for each user) provide a set of known H values having corresponding X values (e.g., feature vectors extracted from the pairs of batches of speech inputs).

Using these data, the model parameter β can be computed using data fitting techniques such as least squares, maximum likelihood, or the like. Once β is estimated, the model can then compute (e.g., an intent classification and transcription of speech input) for a new set of X values (e.g., feature vectors extracted from a new speech input).

Machine learning techniques train models to accurately make predictions on data fed into the models. During a learning phase, the models are developed against a training dataset of inputs to optimize the models to correctly predict the output for a given input. Generally, the learning phase may be supervised, semi-supervised, or unsupervised, indicating a decreasing level to which the "correct" outputs are provided in correspondence to the training inputs. In a supervised learning phase, all of the outputs are provided to the model and the model is directed to develop a. general rule or algorithm that maps the input to the output. In contrast, in an unsupervised learning phase, the desired output is not provided for the inputs so that the model may develop its own rules to discover relationships within the training dataset. In a semi-supervised learning phase, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised learning phase, a model is developed to predict the output for a given set of inputs and is evaluated over several epochs to more reliably provide the output that is specified as corresponding to the given input for the greatest number of inputs for the training dataset. In another example, for an unsupervised learning phase, a model is developed to cluster the dataset into n groups and is evaluated over several epochs as to how consistently it places a given input into a given group and how reliably it produces the ii desired clusters across each epoch.

Once an epoch is run, the models are evaluated and the values of their variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, and so forth.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data on which it is has not been trained. In a second example, a false positive rate or false negative rate may be used to evaluate the models after finalization. In a third example, a delineation between data clusterings is used to select a model that produces the clearest bounds for its clusters of data.

After being trained, the machine learning technique is provided as the automated speech recognition system 520 and applied to a new, never before seen, speech input. In one example, the coefficient values of the machine learning technique (e.g., the linear model) are stored in a storage of automated speech recognition system 520. The automated speech recognition system 520 is configured to receive new verbal speech input (e.g., dialogue) and generate an intent and/or transcription for the new verbal speech input. The intent and/or transcription is provided to the transcription output module 530. The transcription output module 530 generates a suitable command for the feature of the messaging client 104 to perform a requested function.

As an example, after being trained, the speech to intent system 230 allows an end user to access a given augmented reality experience on a messaging client 104. The speech to intent system 230 can present a visual indicator to inform the user if the given augmented reality experience is conversation enabled. if so, the speech to intent system 230 can accept speech input from the user to navigate through various alternatives or property values of the augmented reality elements of the augmented reality experience that are presented on the messaging client 104 of the end user. The speech to intent system 230 receives speech input from the user via the messaging client 104, such as from a microphone of the client device 102. The speech to intent system 230 can compute an intent for the speech input that indicates a type of augmented reality experience including the type of glasses, the frame color, and/or the lens type and possible interactions available for the augmented reality experience. The speech to intent system 230 can make adjustments to the augmented reality experience based on the intent classification generated for the received speech input and/or the transcription of the speech input.

Figure 6:
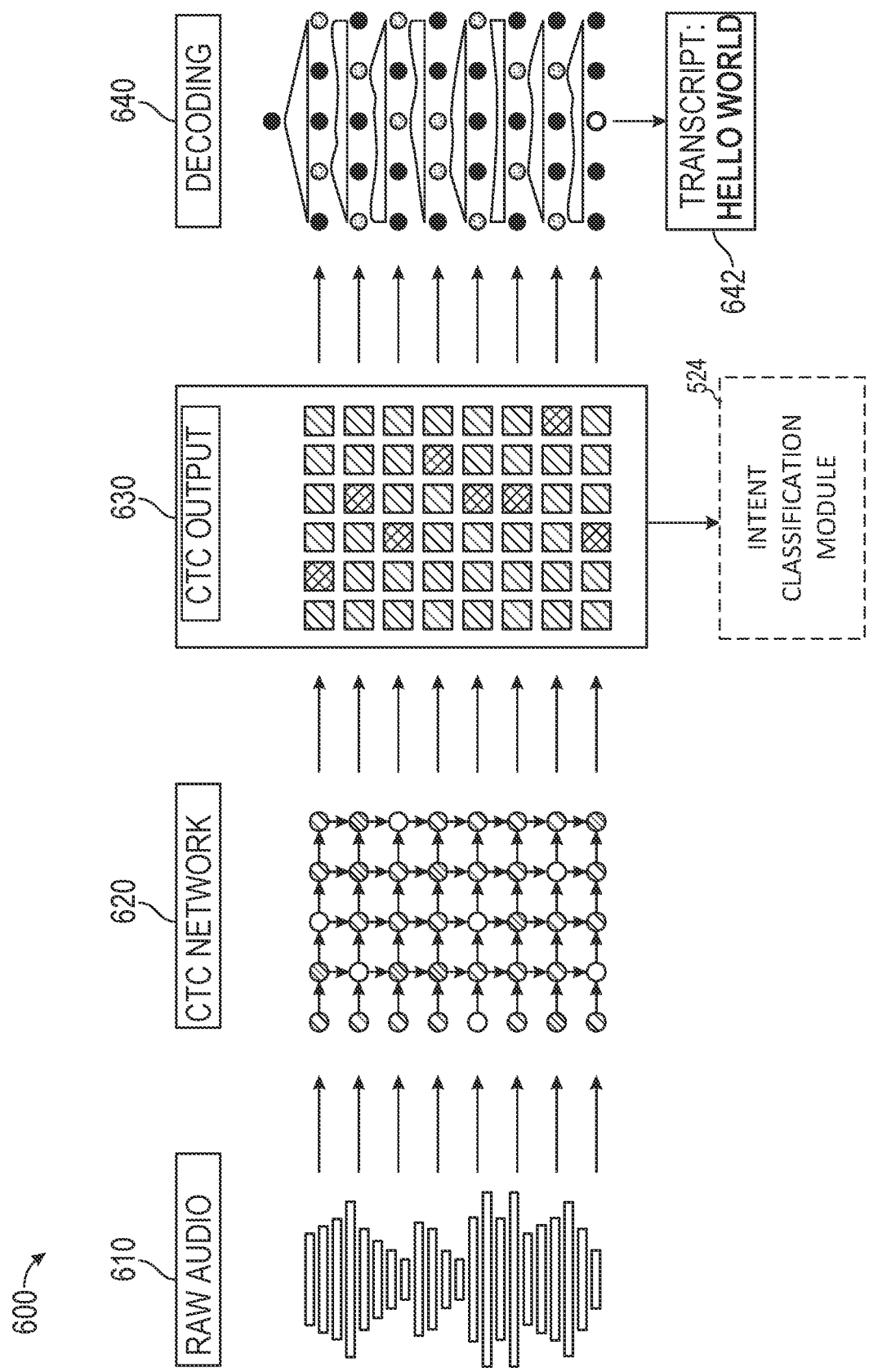
FIG. 6 is a diagrammatic representation of process flows of the speech to intent system, in accordance with some examples.

In one example, the speech recognition module 522 implements a first neural network, such as a recurrent neural network or other machine learning model. The speech recognition module 522 receives a speech input audio file, such as the raw audio file 610 shown in the process flow 600 (FIG. 6). The speech recognition module 522 implements a Connectionist Temporal Classification (CTC) network 620 that is applied to the raw audio file 610. The CTC network 620 generates a logit lattice that includes a matrix 630 of probabilities of different characters that map to the spoken speech input according to different time points. An example matrix is shown and discussed in connection with FIG. 7. The matrix 630 represents an initial character-based representation of the speech input generated by the speech recognition module 522.

The matrix 630 represents probabilities of a plurality of characters corresponding to the speech input over time. In an example, rows of the matrix represent different time points of the speech input and columns of the matrix represent different characters of a transcript of the speech input. The speech input audio file can be divided into several equal or non-equal time intervals (e.g., 2-3 millisecond time intervals). For each time interval, a probability is assigned to each of a plurality of characters indicating a likelihood that the spoken audio content in the interval corresponds to the given character. For example, for a given spoken content in a particular time interval, a 0.1 probability can be assigned to the character 'a', a 0.3 probability can be assigned to the character 'b', a 0.2 probability can be assigned to the character 'c', a 0.6 probability can be assigned to the character 'd', and so forth. This can be performed across all of the time intervals and be stored in the matrix. In some cases, each row of the matrix can be streamed as a linear combination of the probabilities. Each row can be encoded or compressed into a vector of characters over time.

After generating the matrix 630, the speech recognition module 522 enters a decoding phase 640. During the decoding phase 640, the speech recognition module 522 processes the matrix 630 to generate a transcription of the speech input contained in the received audio file. The speech recognition module 522 can apply one or more heuristics, such as combining the highest probability characters over time into one or more words to generate the transcription.

While the speech recognition module 522 is in the decoding phase 640, the matrix 630 is streamed and processed by the intent classification module 524, as shown in FIG. 6. In an example, the intent classification module 524 implements a. second neural network. The intent classification module 524 receives streams of characters from the matrix 630 and generates an estimated intent based on the probabilities associated with the characters of the matrix 630. For example, the intent classification module 524 can process a first combination of characters from a first row of the matrix 630 and/or a second combination of the characters from a second row of the matrix 630 to generate a first estimated intent associated with the speech input. The intent classification module 524 operates on a set of characters to generate an intent rather than operating on a collection of words. The estimated intent can be generated after a certain number of character vectors are received or after receiving all of the matrix 630.

For example, the intent classification module 524 can receive a matrix 630 shown in FIG. 7 or portions of the matrix 630. The matrix 630 includes a plurality of rows 710 and a plurality of columns 720. Each of the columns 720 of the matrix 630 represents a probability of a particular character of a plurality of characters (C1, C2, C3, ... Cn) (e.g., letters of the English alphabet) that occurs at a particular time interval associated with the speech input. Each row 710 represents a collection of characters and their respective probabilities for a particular time interval. For example, for a given time interval T1, the row 710 represents a first probability 714 that the spoken content during the given time interval T1 corresponds to the letter C1 and represents a second probability 712 that the spoken content during the given time interval T1 corresponds to the letter C6. This row 710 can be received in encoded form and processed by the intent classification module 524 to generate an estimated intent. In some cases, the intent classification module 524 operates on a certain quantity or number of rows 710 to generate the estimated intent.

In some cases, the intent classification module 524 receives a linear combination of elements of a row 710 of the matrix 630. For example, a linear combination can be formed by multiplying the probability (e.g., P1) of a given cell in the row 710 by an integer or non-integer value representing the corresponding character (e.g., C1) associated with the probability and accumulating such multiplied value across each cell in the row 710. Namely, the linear combination can be formed as a function of P1*C1+P2*C2+P3*C3+Pn*Cn. This linear combination can then be generated for each row 710 of the matrix 630 or a portion of the rows of the matrix 630. In some cases, a vector of the linear combinations of each row can be formed and processed by the intent classification module 524 to estimate the intent. Namely, the linear combination can then be processed by the intent classification module 524 to generate an estimated intent associated with the linear combination or subset of linear combinations. Other ways to encode a given row 710 can similarly be applied.

A loss can be computed based on the intent classification that is estimated based on the linear combination of the row or rows 710 by comparing the intent classification with the ground-truth intent classification. A gradient of the loss can be computed and used to update parameters of the speech recognition module 522 in addition to a loss computed for the transcription generated by the speech recognition module 522.

In some cases, the intent classification module 524 can generate an intent classification for each combination of different characters or subsets of characters across each row 710 or subset of rows 710 of the matrix 630.

The intent classification module 524 can then feed back the estimated intent and/or the likely characters associated with the estimated intent to the speech recognition module 522. The speech recognition module 522 can adjust or refine the decoding phase 640 based on the estimated intent received from the intent classification module 524.

During training, the automated speech recognition system 520 obtains a first training speech input (including a first training speech audio file). The automated speech recognition system 520 provides the first training speech input to the speech recognition module 522 to generate the matrix 630. The matrix 630 of the first training speech input is provided to the intent classification module 524 to generate a first estimated intent while the speech recognition module 522 is decoding the matrix 630 to generate a transcription. The first estimated intent is provided from the intent classification module 524 to the speech recognition module 522, in some cases by specifying which characters of the matrix 630 are most likely associated with the first estimated intent. The speech recognition module 522 can refine or make adjustments to the decoding phase 640 to generate or refine a transcription of the first training speech input.

After the speech recognition module 522 generates or refines the transcription in completing the decoding phase 640, the automated speech recognition system 520 computes a loss for the automated speech recognition system 520 based on two cost functions. A first of the two cost functions compares the first estimated intent generated by the intent classification module 524 with a ground-truth intent associated with the first training speech input. A second of the two cost functions compares the transcription generated by the speech recognition module 522 with the ground-truth transcription associated with the first training speech input. Parameters of the speech recognition module 522 and the intent classification module 524 are updated, such as by performing backpropagation through gradients of the loss.

In some cases, a gradient of the first cost function is used to update parameters of the second neural network (implementing the intent classification module 524) and fed back in a backpropagation to update parameters of the first neural network (implementing the speech recognition module 522).

The automated speech recognition system 520 continues this process by retrieving additional training speech inputs and recomputing the loss to continue to update parameters of the first and second neural networks until a stopping criterion is met and/or when all of the batches of training data have been processed.

Figure 8:
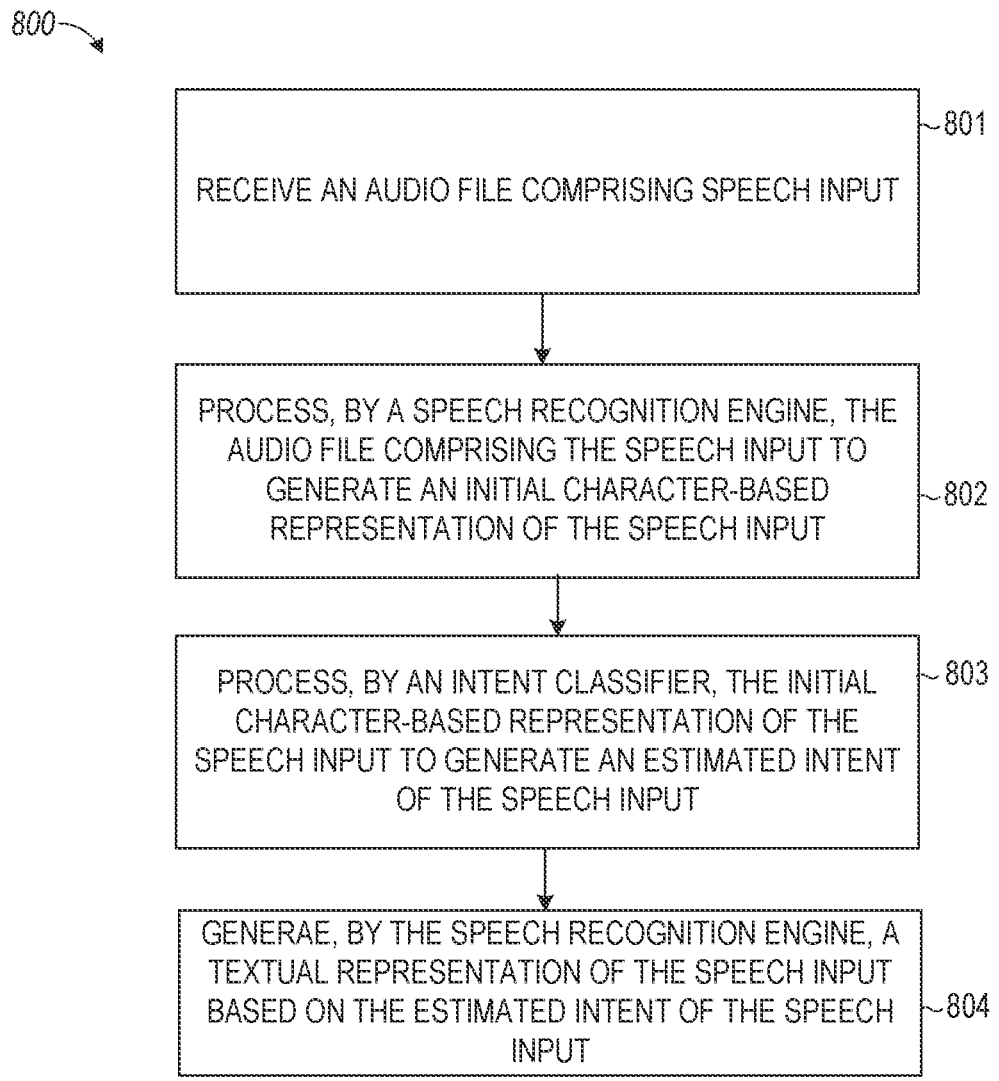
FIG. 8 is a flowchart illustrating example operations of the speech to intent system, according to example examples.

FIG. 8 is a flowchart illustrating example operations of the messaging client 104 in performing process 800, according to example examples. The process 800 may be embodied in computer-readable instructions for execution by one or more processors such that the operations of the process 800 may be performed in part or in whole by the functional components of the messaging server system 108; accordingly, the process 800 is described below by way of example with reference thereto. However, in other examples at least some of the operations of the process 800 may be deployed on various other hardware configurations. The operations in the process 800 can be performed in any order, in parallel, or may be entirely skipped and omitted.

At operation 801, the messaging server system 108 receives an audio file comprising speech input, as discussed above.

At operation 802, the messaging server system 108 processes, by a speech recognition engine, the audio file comprising the speech input to generate an initial character-based representation of the speech input, as discussed above.

At operation 803, the messaging server system 108 processes, by an intent classifier, the initial character-based representation of the speech input to generate an estimated intent of the speech input, as discussed above.

At operation 804, the messaging server system 108 generates, by the speech recognition engine, a textual representation of the speech input based on the estimated intent of the speech input, as discussed above.

Machine Architecture

Figure 9:
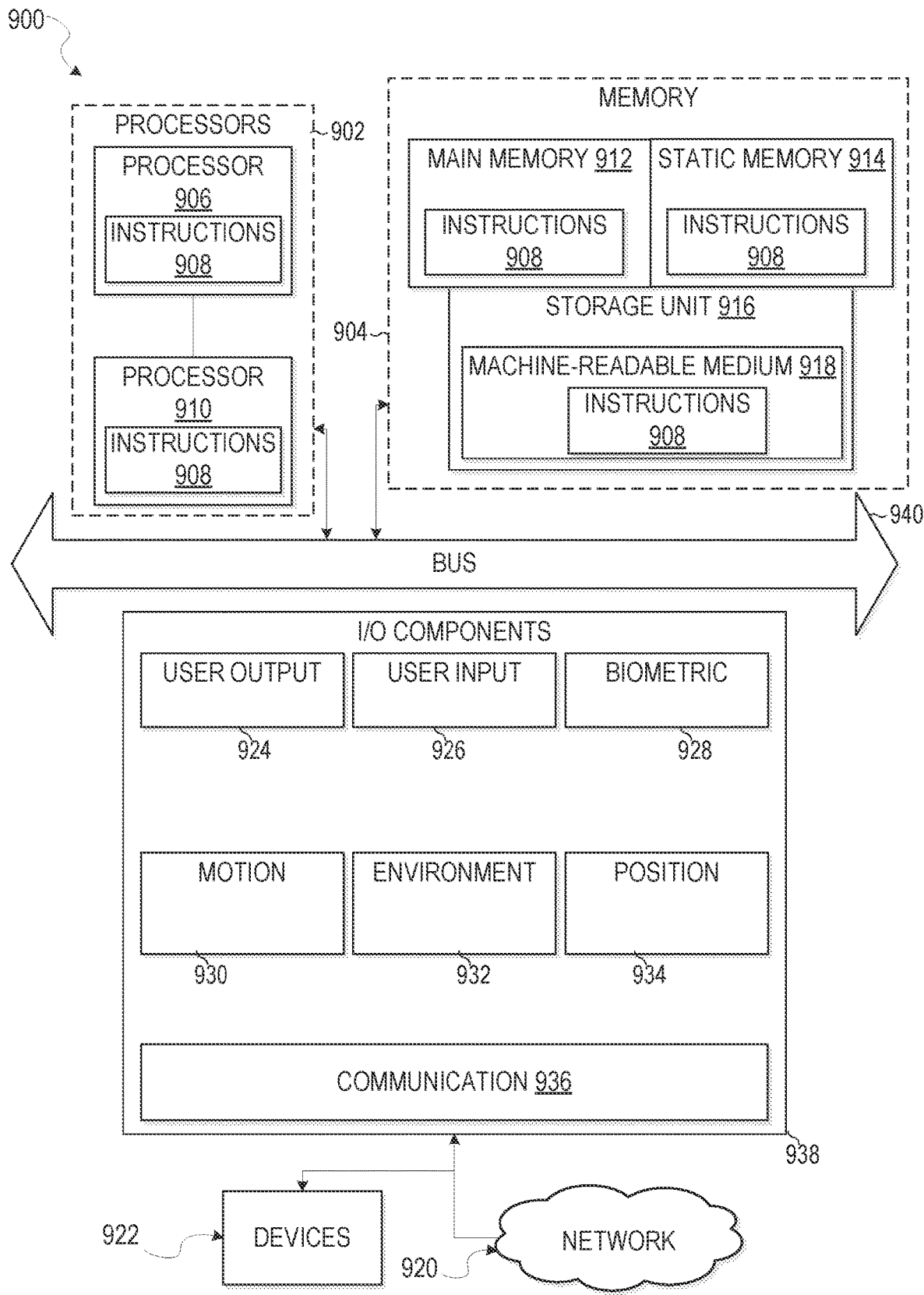
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 908 (e.g., software, a program, an application, an apples, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900 Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 912, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902. within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (;e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple camera systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth®Low Energy), Wi-Fi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NEC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
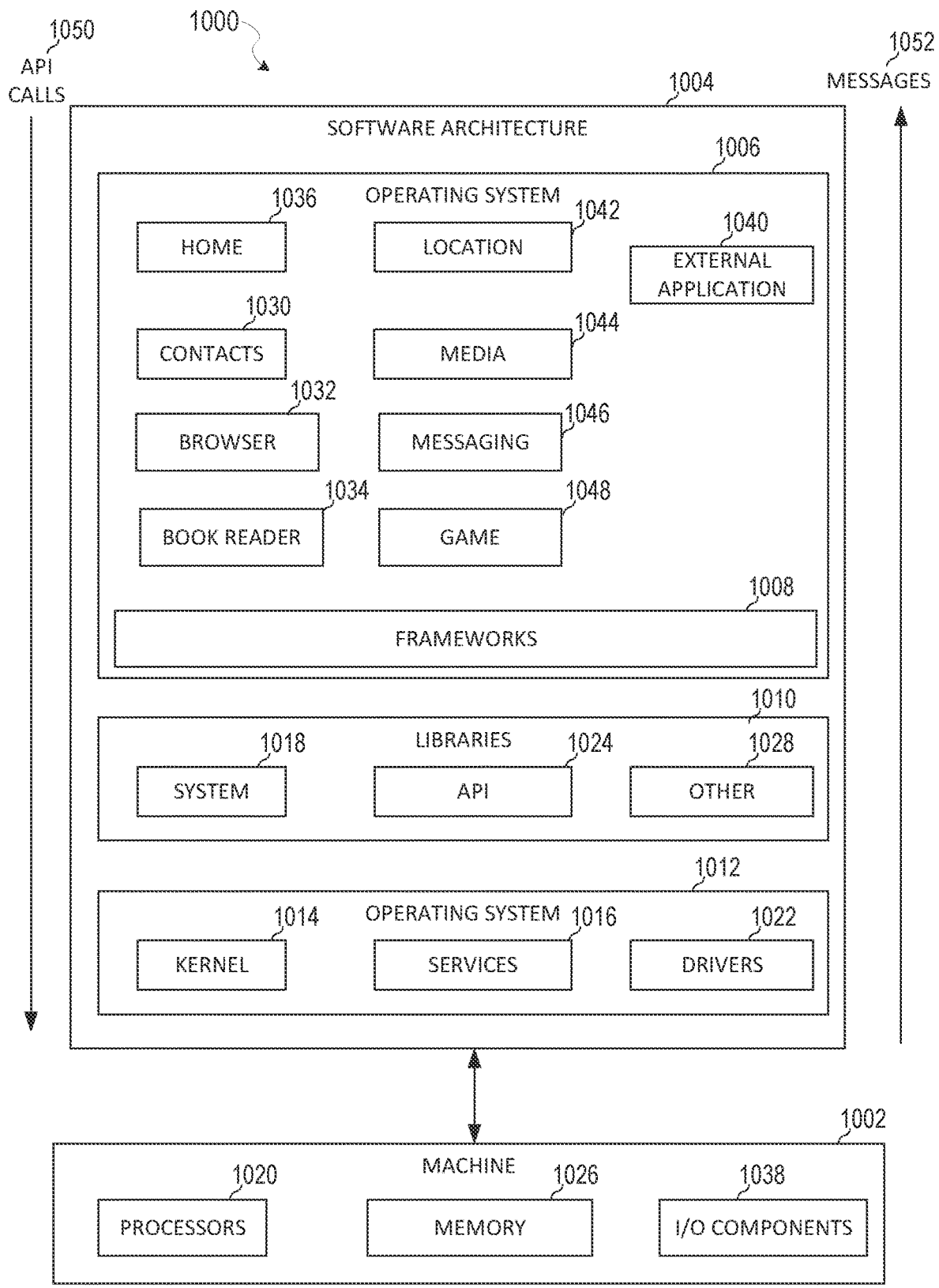
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e,g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications, such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may he a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component"(or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example examples, the processors or processor-implemented components may be located in a single geographic location (e.g., within a home environment, an office environment, or a server farm). In other example examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
receiving, by one or more processors, an audio file comprising speech input;
processing, by a speech recognition engine, the audio file comprising the speech input to generate an initial character-based representation of the speech input, the initial character-based representation being generated based on an association between an individual point in time of the speech input with a first probability that the speech input corresponds to a first character of a plurality of individual characters and an association between the individual point in time of the speech input with a second probability that the speech input corresponds to a second character of the plurality of individual characters;
processing, by an intent classifier, the initial character-based representation of the speech input to generate an estimated intent of the speech input; and
generating, by the speech recognition engine, a textual representation of the speech input based on the estimated intent of the speech input.

2. The method of claim 1, wherein the speech recognition engine and the intent classifier are arranged as a cascade neural network. and the method further comprises training the speech recognition engine and the intent classifier in an end-to-end manner.

3. The method of claim 1, wherein generating the initial character-based representation of the speech input comprises:
generating a matrix that represents probabilities of the plurality of individual characters corresponding to the speech input over time.

4. The method of claim 3, wherein for a first row of rows of the matrix corresponding to a first time point in the speech input, each of the plurality of individual characters in columns of matrix, associated with the first row, is associated with a respective probability representing a likelihood that the speech input corresponds to a respective one of the plurality of individual characters.

5. The method of claim 4, further comprising streaming a linear combination of a subset of the rows of the matrix.

6. The method of claim 5, further comprising:
streaming a first linear combination of characters comprising a first subset of characters associated with a first set of respective probabilities for the first time point; and
streaming a second linear combination of characters comprising a second subset of characters associated with a second set of respective probabilities for a second time point.

7. The method of claim 6, further comprising generating the estimated intent of the speech input based on the first and second linear combinations of the characters.

8. The method of claim 4, further comprising encoding the matrix into a vector of characters over time.

9. The method of claim 1, wherein the initial character-based representation of the speech input is processed by the intent classifier while the speech recognition engine generates the textual representation of the speech input.

10. The method of claim 1, wherein the speech recognition engine comprises a first neural network and the intent classifier comprises a second neural network.

11. The method of claim 10, further comprising:
computing a loss function that comprises first and second cost functions, the first cost function being based on the estimated intent of the speech input, and the second cost function being based on the textual representation of the speech input; and
updating parameters of the first and second neural networks based on the loss function, wherein gradients of the first cost function are back-propagated to the second cost function.

12. The method of claim 1, further comprising:
receiving training data comprising a plurality of training audio files, the plurality of audio files comprising the audio file, each of the plurality of training audio files being associated with a ground-truth intent classification and a ground-truth transcription;
processing a first training audio file of the plurality of training audio files by the speech recognition engine to generate an estimated textual representation;
while the speech recognition engine processes the first training audio file, generating a first initial character-based representation of the first training audio file;
processing, by the intent classifier, the first initial character-based representation of the speech input to generate a first estimated intent classification;
comparing the first estimated intent classification to the ground-truth intent classification associated with the first training audio file to generate a first loss;
comparing the estimated textual representation to the ground-truth transcription associated with the first training audio file to generate a second loss; and
updating parameters of the speech recognition engine and the intent classifier based on the first and second losses.

13. The method of claim 12, further comprising processing a second training audio file of the plurality of training audio files to further update parameters of the speech recognition engine and the intent classifier.

14. The method of claim 1, wherein the intent classifier generates the estimated intent of the speech input based on different linear combinations of probabilities of characters of the speech input over time.

15. The method of claim 3, wherein the intent classifier generates the estimated intent of the speech input before the speech recognition engine generates a transcription of the speech input, wherein rows of the matrix represent different time points of the speech input, and wherein columns of the matrix represent different characters of a transcript of the speech input.

16. A system comprising:
at least one processor configured to perform operations comprising:
receiving an audio file comprising speech input;
processing, by a speech recognition engine, the audio file comprising the speech input to generate an initial character-based representation of the speech input, the initial character-based representation being generated based on an association between an individual point in time of the speech input with a first probability that the speech input corresponds to a first character of a plurality of individual characters and an association between the individual point in time of the speech input with a second probability that the speech input corresponds to a second character of the plurality of individual characters;

processing, by an intent classifier, the initial character-based representation of the speech input to generate an estimated intent of the speech input; and generating, by the speech recognition engine, a textual representation of the speech input based on the estimated intent of the speech input.

17. The system of claim 16, wherein the speech recognition engine and the intent classifier are arranged as a cascade neural network, and the operations further comprise training the speech recognition engine and the intent classifier in an end-to-end manner.

18. The system of claim 16, wherein generating the initial character-based representation of the speech input comprises:

generating a matrix that represents probabilities of the plurality of individual characters corresponding to the speech input over time, wherein rows of the matrix represent different time points of the speech input, and wherein columns of the matrix represent different characters of a transcript of the speech input.

19. The system of claim 18, wherein for a first row of the rows of the matrix corresponding to a first time point in the speech input, each of the plurality of individual characters in the columns of the matrix, associated with the first row, is associated with a respective probability representing a likelihood that the speech input corresponds to a respective one of the plurality of individual characters.

20. A non-transitory machine-readable storage medium that includes instructions that, when executed by one or more processors of a client device, cause the client device to perform operations comprising:

receiving an audio file comprising speech input;

processing, by a speech recognition engine, the audio file comprising the speech input to generate an initial character-based representation of the speech input, the initial character-based representation being generated based on an association between an individual point in time of the speech input with a first probability that the speech input corresponds to a first character of a plurality of individual characters and an association between the individual point in time of the speech input with a second probability that the speech input corresponds to a second character of the plurality of individual characters;

processing, by an intent classifier, the initial character-based representation of the speech input to generate an estimated intent of the speech input; and generating, by the speech recognition engine, a textual representation of the speech input based on the estimated intent of the speech input.

* * * * *